United States Patent [19]
Harris

[11] Patent Number: 5,335,108
[45] Date of Patent: * Aug. 2, 1994

[54] ROTATING DISC OPTICAL SYNCHRONIZATION SYSTEM USING ALTERNATING BINARY DIFFRACTIVE OPTICAL ELEMENTS

[75] Inventor: Ellis D. Harris, Claremont, Calif.

[73] Assignee: Xerox Corporation, Stamford, Conn.

[*] Notice: The portion of the term of this patent subsequent to Nov. 2, 2010 has been disclaimed.

[21] Appl. No.: 155,348

[22] Filed: Nov. 22, 1993

Related U.S. Application Data

[63] Continuation of Ser. No. 989,321, Dec. 11, 1992, abandoned.

[51] Int. Cl.[5] ............ G02B 5/18; G02B 26/10; G02B 27/44
[52] U.S. Cl. .................... 359/209; 235/457; 359/18; 359/565; 359/569
[58] Field of Search ............ 359/17, 18, 565, 566, 359/569, 209, 210; 235/457

[56] References Cited

U.S. PATENT DOCUMENTS

| | | |
|---|---|---|
| 3,619,033 | 11/1971 | McMahon . |
| 4,289,371 | 9/1981 | Kramer . |
| 4,415,224 | 11/1983 | Dickson .................. 359/18 |
| 4,678,263 | 7/1987 | Funato . |
| 4,758,058 | 7/1988 | Cato et al. . |
| 4,810,046 | 3/1989 | Yamagishi et al. . |
| 4,895,790 | 1/1990 | Swanson et al. ............. 430/321 |
| 5,073,007 | 12/1991 | Kedmi et al. ................ 359/565 |
| 5,258,862 | 11/1993 | Harris ....................... 359/18 |

OTHER PUBLICATIONS

Wolfheimer, "Holographic Disc Test Apparatus", *IBM Technical Disclosure Bulletin*, vol. 25, No. 11B, Apr. 1983, pp. 6280 to 6281.

W. Veldkamp & T. McHugh, "Binary Optics", *Scientific American*, vol. 266, No. 5, May 1992, pp. 92-97.

G. J. Swanson, "Binary Optics Technology: The Theory and Design of Multi-Level Diffractive Optical Elements", Lincoln Laboratory, Massachusetts Institute of Technology, *Technical Reports 854*, 14 Aug. 1989.

*Primary Examiner*—Martin Lerner
*Attorney, Agent, or Firm*—William Propp

[57] ABSTRACT

An optical synchronization system uses a rotating disc with alternating binary diffractive optical elements for a synchronization signal for a pixel clock.

5 Claims, 4 Drawing Sheets

ROTATING DISC OPTICAL SYNCHRONIZATION SYSTEM USING ALTERNATING BINARY DIFFRACTIVE OPTICAL ELEMENTS

This is a continuation of application Ser. No. 07/989,321 filed Dec. 11, 1992 now abandoned.

CROSS-REFERENCE TO RELATED APPLICATIONS

This application contains subject matter that is related to subject matter of U.S. Pat. Nos. 5,258,862 and 5,291,319, both assigned to the same assignee herein.

BACKGROUND OF THE INVENTION

This invention relates to an optical synchronization system for a rotating disc, and, more particularly, to an optical synchronization system with alternating binary diffractive optical elements for a rotating disc.

The propagation of a light beam can be changed by three basic means: reflection by a mirror, refraction by a lens and diffraction by a grating. Optical systems traditionally rely on reflection and refraction to achieve the desired optical transformation. Optical design, based on mirror and lens elements, is a well-established and refined process. Until recently, the problems with diffraction and fabricating high efficiency diffractive elements have made diffractive elements unfeasible components of optical systems.

The diffractive process does not simply redirect a light beam. Diffraction, unlike refraction and reflection, splits a light beam into many beams—each of which is redirected at a different angle or order. The percentage of the incident light redirected by the desired angle is referred to as the diffraction efficiency. The diffraction efficiency of a diffractive element is determined by the element's surface profile. If the light that is not redirected by the desired angle is substantial, the result will be an intolerable amount of scatter in the image or output plane of the optical system.

Theoretically, diffractive phase elements can achieve 100 percent diffraction efficiency at a given wavelength. To achieve this efficiency, however, a continuous phase profile is necessary. The theoretical diffraction efficiency of this surface profile is also relatively sensitive to a change in wavelength. By contrast, refractive elements are wavelength insensitive. The technology for producing high quality, high efficiency, continuous phase profiles does not presently exist.

A compromise that results in a relatively high diffraction efficiency and ease of fabrication is a multi-level phase grating. The larger the number of discrete phase levels, the better the approximation of the continuous phase function. These multi-level phase profiles can be fabricated using standard semiconductor integrated circuit fabrication techniques.

As disclosed in *Binary Optics Technology: The Theory and Design of Multilevel Diffractive Optical Elements* by G. J. Swanson of the Lincoln Laboratory at the Massachusetts Institute of Technology, (Technical Report 854, Aug. 14, 1989) and the resulting U.S. Pat. No. 4,895,790, a fabrication process for a binary diffractive optical element or multi-level phase profile diffraction grating starts with a mathematical phase description of a diffractive phase profile and results in a fabricated multi-level diffractive surface. The first step is to take the mathematical phase expression and generate from it a set of masks that contain the phase profile information. The second step is to transfer the phase profile information from the masks into the surface of the element specified by the lens design.

The first step involved in fabricating the multi-level element is to mathematically describe the ideal diffractive phase profile that is to be approximated in a multi-level fashion. The next step in the fabrication process is to create a set of lithographic masks which are produced by standard pattern generators used in the integrated circuit industry.

A substrate of the desired material is coated with a thin layer of photoresist. The lithographic mask is then placed in intimate contact with the substrate and illuminated from above with an ultraviolet exposure lamp. Alternately, pattern generators, either optical or electron beam, can expose the thin layer of photoresist. The photoresist is developed, washing away the exposed resist and leaving the binary grating pattern in the remaining photoresist. This photoresist will act as an etch stop.

The most reliable and accurate way to etch many optical materials is to use reactive ion etching. The process of reactive ion etching anisotropically etches material at very repeatable rates. The desired etch depth can be obtained very accurately. The anisotropic nature of the process assures a vertical etch, resulting in a true binary surface relief profile. Once the substrate has been reactively ion etched to the desired depth, the remaining photoresist is stripped away, leaving a binary phase surface relief grating.

The process is repeated using a lithographic mask having half the period of the first mask. The binary phase element is recoated with photoresist and exposed using the second lithographic mask which has half the period of the first mask. After developing and washing away the exposed photoresist, the substrate is reactively ion etched to a depth half that of the first etch. Removal of the remaining photoresist results in a 4 level approximation to the desired profile. The process is repeated a third and fourth time with lithographic masks having periods of one-quarter and one-eighth that of the first mask, and etching the substrates to depths of one-quarter and one-eighth that of the first etch. The successive etches result in elements having 8 and 16 phase levels.

This process is repeated to produce a multilevel phase relief structure in the substrate. The result is a discrete, computer-generated structure approximating the original idealized diffractive surface. For each additional mask used in the fabrication process, the number of discrete phase levels is doubled, hence the name "binary" optical element or, more precisely, a binary diffractive optical element.

After only four processing iterations, a 16 phase level approximation to the continuous case can be obtained. This mask and etch fabrication process can be carried out in parallel, producing many elements simultaneously, in a cost-effective manner.

A 16 phase level structure achieves 99 percent diffraction efficiency. The residual 1 percent of the light is diffracted into higher orders and manifests itself as scatter. In many optical systems, this is a tolerable amount of scatter. The fabrication of the 16 phase level structure is relatively efficient due to the fact that only four processing iterations are required to produce the element.

The photolithographic etch steps can be done in any order. Alternatively, the highest pitch, shallowest level is processed first since this level is more difficult to control if etched following deeper etches.

After the first etching step, the second and subsequent lithographic masks have to be accurately aligned to the existing pattern on the substrate. Alignment is accomplished using another tool standard to the integrated circuit industry, a mask aligner.

As noted, the photoresist on the substrate can be exposed with an electron-beam pattern generator. The e-beam direct-write process eliminates masks and their corresponding alignment and exposure problems. Binary optics have also been reproduced using epoxy casting, solgel casting, embossing, injection molding and holographic reproduction.

Binary optical elements have a number of advantages over conventional optics. Because they are computer-generated, these elements can perform more generalized wavefront shaping than conventional lenses or mirrors. Elements need only be mathematically defined: no reference surface is necessary. Therefore, wildly asymmetric binary optics are able to correct aberrations in complex optical systems, and elements can be made wavelength-sensitive for special laser systems.

The diffractive optical elements are generally thinner, lighter and can correct for many types of aberrations and distortions. It is possible to approximate a continuous phase profile with a stepwise profile of discrete phase levels.

Optical scanning systems are used to scan a spot of light along a predetermined pattern such as a scan line on a photoreceptor. Optical elements such as refractive lens or diffractive holograms or gratings can be disposed circumferentially in annular sectors around a rotating disc to generate a scan line and function as an optical scanning system. Even binary diffractive optical elements can be used as the scanning elements in a rotating disc optical scanner as taught in copending patent applications Ser. Nos. 07/989,445 and 07/989,320, commonly assigned with the present application and herein incorporated by reference.

One of the problems inherent in any optical scanning system is monitoring and synchronizing the scanning point of light along the scan line and from scan line to scan line. This is typically done with photodetectors located on a photoreceptor located at the start of scan and the end of scan. But these photodetectors do not monitor and synchronize the entire continuous scan, only the ends.

An alternate system would remove a portion of the scanning beam itself to provide the monitoring and synchronizing function.

It is an object of this invention to provide an optical synchronization system for a rotating disc using binary diffractive optical elements.

It is another object of this invention to provide an optical synchronization system over the entire continuous scan line.

It is another object of this invention to provide an optical synchronization system which does not use the scanning beam itself.

SUMMARY OF THE INVENTION

In accordance with the present invention, an optical synchronization system uses a rotating disc with alternating binary diffractive optical elements for a synchronization signal for a pixel clock.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
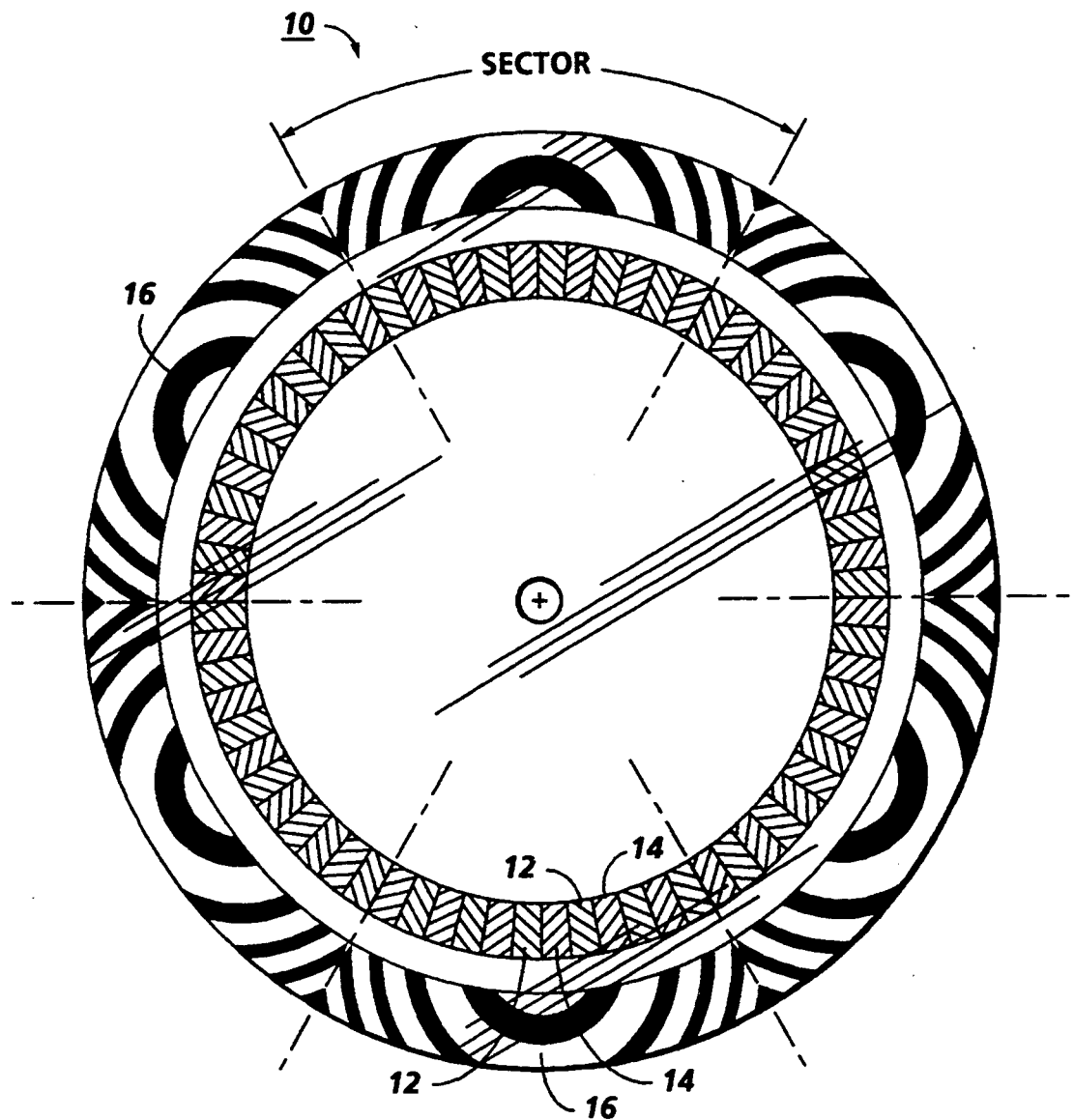
FIG. 1 is a schematic illustration of the binary diffractive optical element disc for an optical synchronization system formed according to the present invention.

Reference is now made to FIG. 1, wherein there is illustrated a rotatable transparent disc 10 which has a plurality of alternating first binary diffractive optical elements 12 and second binary diffractive optical elements 14 disposed circumferentially in annular sectors around the rotatable disc to generate an optical synchronization signal for a pixel clock.

Figure 2:
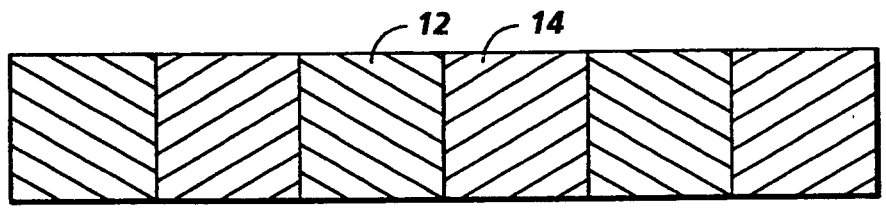
FIG. 2 is a schematic illustration of the annular sectors of alternating binary diffractive optical elements of the binary diffractive optical element disc of FIG. 1 formed according to the present invention.

As shown in FIG. 2, the first binary diffractive optical elements 12 alternate with the second binary diffractive optical elements 14 in the annular sectors. The multilevel phase relief structure of the binary diffractive optical element will diffract and focus any incident light. The first binary diffractive optical element 12 and the second binary diffractive optical element 14 have the same width and height and cover the same surface area on the annular sector of the rotatable transparent disc 10.

The multilevel phase relief structure of each binary diffractive optical element 12 is the same so that any incident light beam will be diffracted and focused to the same position. The multilevel phase relief structure of each binary diffractive optical element 14 is the same so that any incident light beam will be diffracted and focused to the same position. However, the multilevel phase relief structures of elements 12 and 14 are different so that each element will diffract and focus light to a different position.

Figure 3:
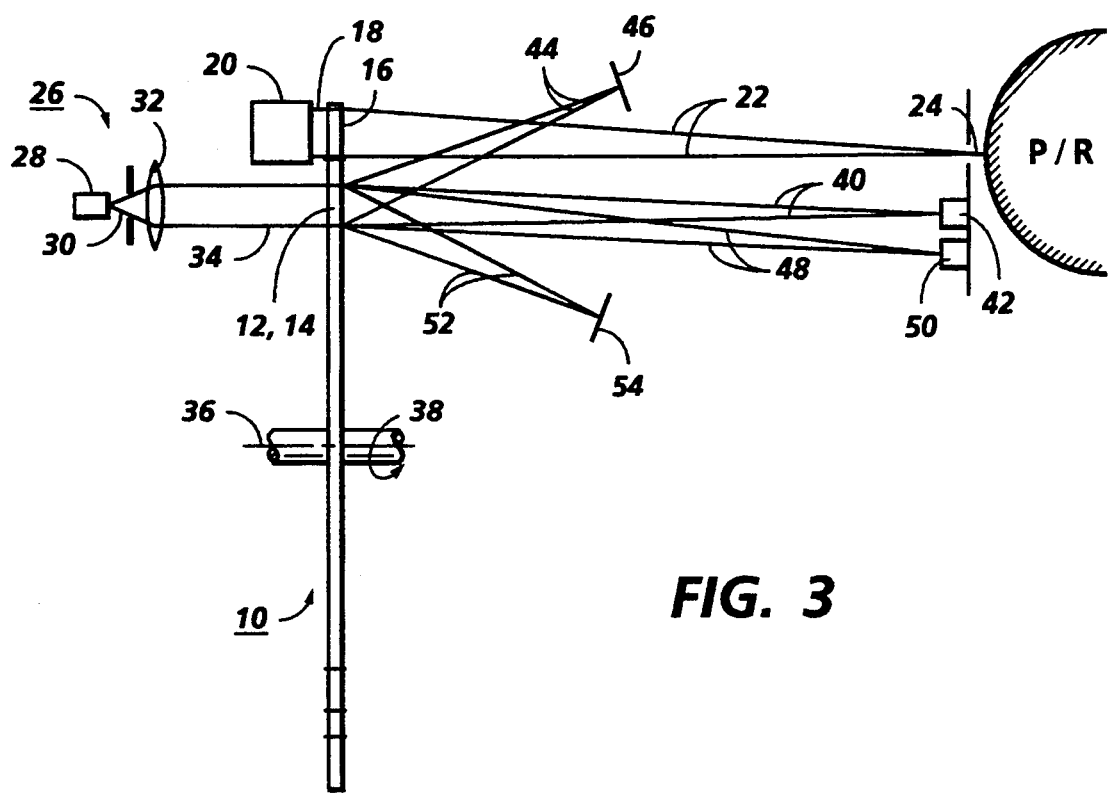
FIG. 3 is a schematic illustration of an optical synchronization system using a rotating binary diffractive optical element disc formed according to the present invention.

As shown in FIG. 1, the rotatable disc 10 also has the scanning elements 16 such as holograms, diffraction gratings, binary diffractive optical elements and the like disposed circumferentially in annular sectors around the disc to generate a scan line. As shown in FIG. 3, a light beam 18 from light source 20 will be diffracted or refracted by the scanning element 16 to form a scanning beam 22 to scan a scan line 24. A plurality of the plurality of alternating binary diffractive optical elements will correspond to a scanning element so that the optical synchronization system for the rotating disc is for an optical scanning system on the rotating disc.

If the scanning elements 16 on the rotating disc 10 are binary diffractive optical elements as disclosed in copending patent application Ser. Nos. 07/989,445 and 07/989,320, then the alternating binary diffractive optical elements 12 and 14 of the optical synchronization system can be fabricated at the same time and by the same method as the optical scanning system.

The optical synchronization system 26 of FIG. 3, has a light source 28, such as a visible diode laser separate from the optical scanning system light source, which emits a coherent light beam 30 of a single wavelength. The light beam 30 is collimated by collimating lens 32, which may be a molded glass aspherical collimating lens.

The collimated beam 34 is then incident upon the plurality of alternating binary diffractive optical elements 12 and 14 on the rotating disc 10. The alternating binary diffractive optical elements 12 and 14 provides the primary optical focussing in both the tangential and sagittal planes for the synchronizing beams (which will be the first order diffracted beam).

The collimated beam's cross-section is considerably less than the cross-section of either a single binary diffractive optical element 12 or a single binary diffractive optical element 14 so that the binary diffractive optical elements are underfilled.

The incident light beam 34 typically has a normal or perpendicular angle of incidence to the binary diffractive optical element on the rotating disc. The incident beam can be at the Bragg angle of incidence to reduce loss as the beam strikes the front surface of the rotating binary diffractive optical element. The incident beam can, however, have any angle of incidence to the binary diffractive optical element on the rotating disc.

The disc 10 is rotatable about an axis of rotation 36. The rotating disc is driven at a constant speed by a motor (not shown) coupled to the rotor 38 along the axis of rotation of the disc. The rotational movement of the disc 10 cause the light beam 30 to alternate being incident upon the alternating sequence of first binary diffractive optical elements 12 and second binary diffractive optical elements 14 of the rotating disc 10.

The incident collimated light beam 34 will be diffracted by the first binary diffractive optical element 12 so that the first order diffracted beam will be first synchronized beam 40 which is focussed on the first photodetector 42. The zero order, undiffracted light beam 44 from the first binary diffractive optical elements 12 will be blocked by a stop 46.

The incident collimated light beam 34 will be diffracted by the second binary diffractive optical element 14 so that the first order diffracted beam will be second synchronized beam 48 which is focussed on the second photodetector 50. The zero order, undiffracted light beam 52 from the second binary diffractive optical elements 14 will be blocked by a stop 54.

Each of the phase levels in the multilevel phase relief structure of the binary diffractive optical element is a diffractive grating with the pitch varying over the entire element. As the element rotates with the disc, the multilevel phase relief structure of the binary diffractive optical element moves through an incident light beam and this beam is deflected to the same position regardless of rotation.

Light alternately being diffracted and focussed to alternating photoreceptors through each of the alternating rotating binary diffractive optical element will generate a series of synchronization signals for a pixel clock for an optical scanning system elsewhere on the rotating disc 10.

The detected signal by the photodetectors is at a submultiple of the required pixel clock frequency. The light will be chopped as the alternating binary diffractive optical elements alternate focussing the light on the photodetectors. If the shape and spacing of the multilevel phase relief structure diffraction patterns of the alternating elements are chosen appropriately, the electronic signal developed at the photodetectors can be the pixel clock.

Figure 4:
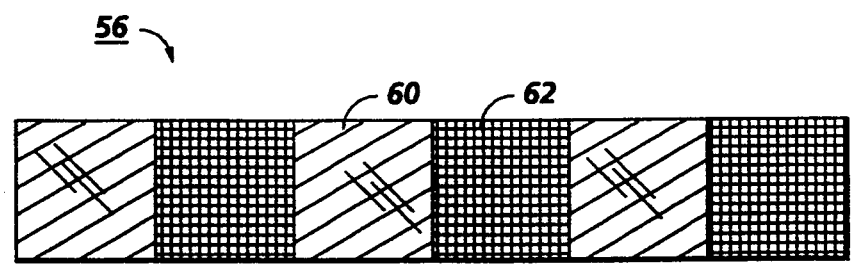
FIG. 4 is a schematic illustration of an alternate embodiment of the annular sectors of alternating binary diffractive optical elements of the binary diffractive optical element disc formed according to the present invention.
Figure 5:
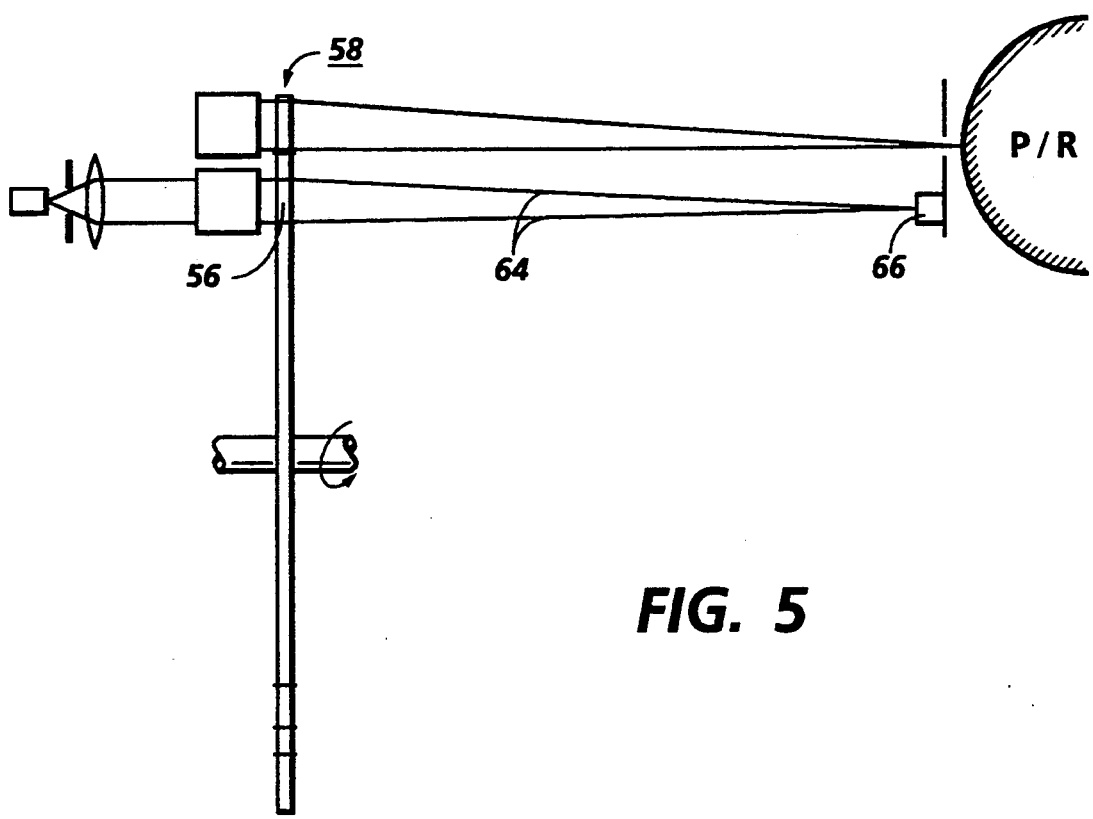
FIG. 5 is a schematic illustration of an optical synchronization system using a rotating binary diffractive optical element disc of FIG. 4 formed according to the present invention.

The annular sector 56 of the rotatable transparent disc 58 of FIGS. 4 and 5, similar to the optical synchronization system 26 of FIG. 3, has alternating binary diffractive optical elements 60 and blocking elements 62 so that the single diffracted synchronization beam 64 will focus on a single photodetector 66. Light alternately being blocked and focussed on the photodetector 66 will generate a series of synchronization signals for a pixel clock for an optical scanning system elsewhere on the rotating disc. The optical synchronization system 26 of FIG. 3 would operate in a similar manner if there was only a single photodetector.

Figure 6:
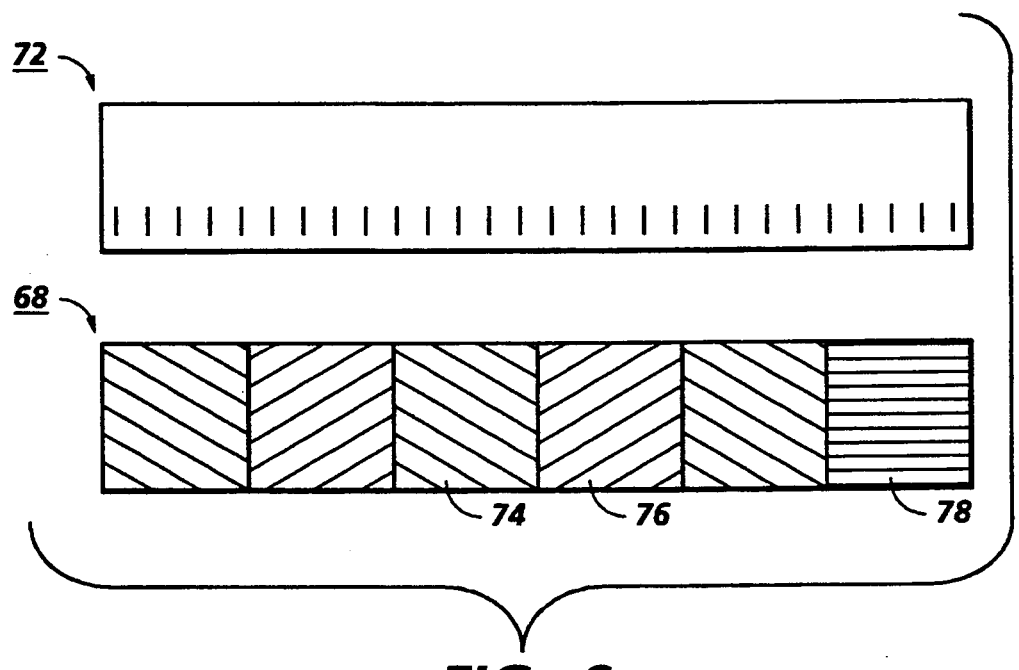
FIG. 6 is a schematic illustration of an alternate embodiment of the annular sectors of alternating binary diffractive optical elements of the binary diffractive optical element disc formed according to the present invention.
Figure 7:
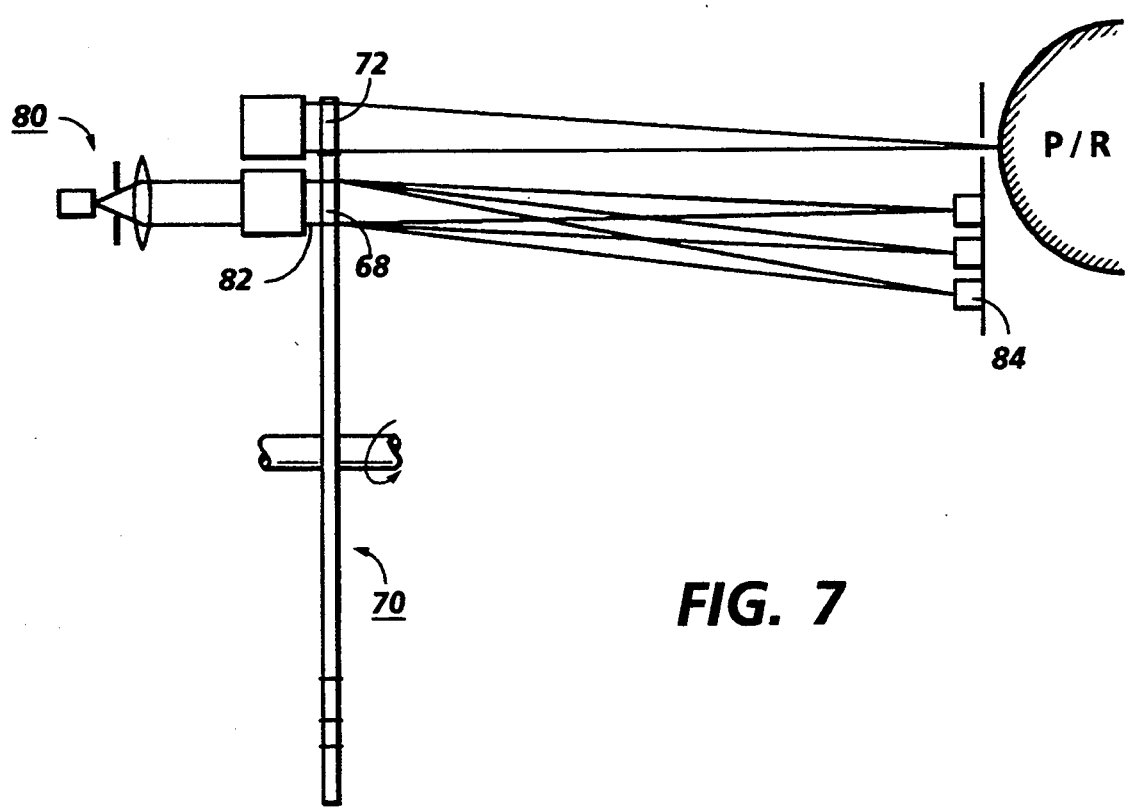
FIG. 7 is a schematic illustration of an optical synchronization system using a rotating binary diffractive optical element disc of FIG. 6 formed according to the present invention.

The annular sector 68 of the rotatable transparent disc 70 of FIGS. 6 and 7 corresponds to scanning element 72. The annular sector 68 has alternating first binary diffractive optical elements 74 and second binary diffractive optical elements 76 and a third binary diffractive optical element 78 at the end of the sector 68 to indicate end of scan and start of scan. The optical synchronization system 80 of FIG. 7 will operate the same as the optical synchronization system 26 of FIG. 3 except incident collimated light beam 82 would be diffracted and focussed by third binary diffractive optical element 78 to the third photodetector to generate a synchronization signal for end of scan and start of scan in the pixel clock.

Any spectral dispersion in any of the optical synchronization systems can be compensated by coordinating the positive dispersion of the glass collimating lens with the negative dispersion inherent in the rotating binary diffractive optical elements.

The rotating binary diffractive optical elements include a negative binary diffractive lens element repeated in the sections of the annulus. The lens' effective focal length is a function of the radius, areas nearer the axis of rotation have shorter focal lengths. This variable effective focal length, increasing as the radius of the binary diffractive optical element on the disc increases, is compensated by the stationary binary diffractive optical element. The effect of the two binary diffractive optical elements is to bring the diffracted beam to a focus.

The rotating binary diffractive optical element need not be a negative optical element but can instead, be a positive element.

A wedge effect can incorporated in the binary diffractive optical elements in the one plane to insure that the diffracted beam can be physically and optically separated from the zero order and unwanted diffraction order beams. Light would be diffracted by the wedge effect toward the center of the axis of rotation (or equivalently away from the center of the axis of rotation).

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. An optical synchronization system for a scanning system on a rotating disc comprising:
    a light source for emitting a coherent light beam,
    means to collimate said coherent light beam,
    scanning elements disposed on said rotating disc,
    a continuous plurality of alternating first binary diffractive optical elements and second binary diffractive optical elements disposed circumferentially on said rotating disc, said continuous plurality of first binary diffractive optical elements and second binary diffractive optical elements being separate from said scanning elements, such that said collimated light beam is alternately diffracted and focussed by said first binary diffractive optical elements onto a first photodetector and diffracted and focussed by said second binary diffractive optical elements onto a second photodetector, said first photodetector and said second photodetector generating a continuous synchronization signal for rotation of said rotating disc.

2. The optical synchronization system for a scanning system on a rotating disc of claim 1 wherein said diffracted and focussed beam is the first order diffracted beam.

3. The optical synchronization system for a scanning system on a rotating disc of claim 1 further comprising
    means to block light from said plurality of first and second binary diffractive optical elements which is not diffracted to said first and second photodetectors.

4. An optical synchronization system for a scanning system on a rotating disc comprising:
    a light source for emitting a coherent light beam,
    means to collimate said coherent light beam,
    a plurality of alternating binary diffractive optical elements and blocking elements disposed circumferentially on said rotating disc such that said collimated light beam is alternately diffracted and focussed by said binary diffractive optical elements onto a first photodetector and blocked by said blocking elements to generate a synchronization signal for rotation of said rotating disc.

5. An optical synchronization system for a scanning system on a rotating disc comprising:
    a light source for emitting a coherent light beam,
    means to collimate said coherent light beam,
    scanning elements disposed on said rotating disc,
    a continuous plurality of alternating first binary diffractive optical elements and second binary diffractive optical elements and third binary diffractive optical elements with equal numbers of said first and second binary diffractive optical elements and fewer of said third binary diffractive optical elements, said first, second and third binary diffractive optical elements disposed circumferentially on said rotating disc, said continuous plurality of first, second and third binary diffractive optical elements being separate from said scanning elements, such that said collimated light beam is alternately diffracted and focussed by said first binary diffractive optical elements onto a first photodetector, diffracted and focussed by said second binary diffractive optical elements onto a second photodetector, and diffracted and focussed by said third binary diffractive optical elements onto a third photodetector, said first photodetector, said second photodetector, and said photodetector generating a continuous synchronization signal for rotation of said rotating disc.

* * * * *